(12) United States Patent
Diehl et al.

(10) Patent No.: US 8,197,333 B2
(45) Date of Patent: Jun. 12, 2012

(54) METHOD AND MANAGEMENT SYSTEM FOR GAMING MANAGEMENT BETWEEN A GAMING MANAGEMENT CENTER AND AT LEAST ONE GAMING TERMINAL, GAMING MANAGEMENT CENTER AND GAMING TERMINAL

(75) Inventors: Eric Diehl, Liffré (FR); Stéphanie Lion, Strasbourg (FR)

(73) Assignee: Thomson Licensing, Boulogne, Billancourt (FR)

( * ) Notice: Subject to any disclaimer, the term of this patent is extended or adjusted under 35 U.S.C. 154(b) by 1632 days.

(21) Appl. No.: 10/481,202

(22) PCT Filed: Jun. 11, 2002

(86) PCT No.: PCT/FR02/01984
§ 371 (c)(1),
(2), (4) Date: Dec. 18, 2003

(87) PCT Pub. No.: WO03/000368
PCT Pub. Date: Jan. 3, 2003

(65) Prior Publication Data
US 2004/0167792 A1    Aug. 26, 2004

(30) Foreign Application Priority Data
Jun. 22, 2001 (FR) .................................... 01 08233

(51) Int. Cl.
*A63F 9/24* (2006.01)
(52) U.S. Cl. ................ 463/25; 463/16; 463/20; 463/29; 463/31; 463/42
(58) Field of Classification Search .............. 463/16–20, 463/25, 29, 26
See application file for complete search history.

(56) References Cited

U.S. PATENT DOCUMENTS

| | | | |
|---|---|---|---|
| 4,157,829 A | 6/1979 | Goldman et al. | |
| 4,582,324 A * | 4/1986 | Koza et al. ..................... | 463/16 |
| 4,677,553 A | 6/1987 | Roberts et al. | |
| 4,856,787 A * | 8/1989 | Itkis ............................... | 273/237 |
| 5,709,603 A * | 1/1998 | Kaye .............................. | 463/17 |
| 5,772,510 A * | 6/1998 | Roberts ......................... | 463/17 |
| 5,779,545 A * | 7/1998 | Berg et al. ..................... | 463/22 |
| 5,816,918 A * | 10/1998 | Kelly et al. .................... | 463/16 |
| 5,871,398 A * | 2/1999 | Schneier et al. .............. | 463/16 |
| 5,928,082 A * | 7/1999 | Clapper, Jr. ................... | 463/16 |
| 5,931,467 A * | 8/1999 | Kamille ........................ | 273/139 |
| 6,080,062 A | 6/2000 | Olson | |

(Continued)

FOREIGN PATENT DOCUMENTS

FR     2 800 492 A    10/2000

(Continued)

*Primary Examiner* — Omkar Deodhar
(74) *Attorney, Agent, or Firm* — Jeffrey D. Carter

(57) ABSTRACT

The invention relates to a method of game management between a game management center and at least one remote game terminal, comprising a step of request of at least one game ticket, from the game terminal, and a step of presentation of the game ticket, by the game terminal. It furthermore comprises, before the step of presentation, a step of generation, by the game management center, of a win indicator determining whether the game ticket presented is a winner or a loser; and a step of transmission by the game management center and to the game terminal, of a result containing said win indicator. During the presentation step, the game terminal generates at least one representation of the game ticket as a function of the result transmitted and presents said game ticket under this representation.

8 Claims, 2 Drawing Sheets

U.S. PATENT DOCUMENTS 6,117,013 A    9/2000    Eiba
6,595,855 B2    7/2003    Sako

FOREIGN PATENT DOCUMENTS

| | | |
|---|---|---|
| FR | 2 800 492 A | 5/2001 |
| JP | 61-120277 | 6/1986 |
| JP | 10-207971 | 8/1998 |
| JP | 10-283423 | 10/1998 |
| JP | 2001-076066 | 3/2001 |
| WO | WO98-36809 | 8/1998 |
| WO | 99/63494 A | 12/1999 |
| WO | 00/25281 A | 5/2000 |

\* cited by examiner

METHOD AND MANAGEMENT SYSTEM FOR GAMING MANAGEMENT BETWEEN A GAMING MANAGEMENT CENTER AND AT LEAST ONE GAMING TERMINAL, GAMING MANAGEMENT CENTER AND GAMING TERMINAL

This application claims the benefit under 35 U.S.C. §365 of International Application PCT/FRO2/01984 filed Jun. 11, 2002, which claims the benefit of French Patent Application No. 01/08233 filed Jun. 22, 2001.

FIELD OF THE INVENTION

The present invention relates to a method and a system of game management between a game management center and at least one remote game terminal. The invention furthermore relates to a game management center and a game terminal.

More precisely, the invention relates to a method of game management of the type comprising a step of request of at least one game ticket, from the game terminal, and a step of presentation of the game ticket, by the game terminal.

BACKGROUND OF THE INVENTION

Such a method of game management is known. In particular, the CyberGrattage® game platform implemented by the company GOTO Software allows a player to request a game ticket from the game management center, using a microcomputer connected to the Internet network. The game ticket comprises several masked boxes, a certain number of which have to be scratched virtually, with the aid of a mouse, in order to remove the corresponding masks and uncover symbols. At least one combination of these symbols uncovered is a winner: it suffices to choose the right boxes.

However, when the ticket is a winner, this method requires an additional exchange of information between the game terminal and the game management center, in order to inform the latter thereof.

SUMMARY OF THE INVENTION

The invention is aimed at remedying the drawbacks of a conventional game management method, by creating a method making it possible to limit the number of exchanges between the game management center and the remote game terminal, for greater security, and which is simple to implement on the game management center side.

A subject of the invention is therefore a method of game management of the aforesaid type, characterized in that it comprises, between the request step and the presentation step: a step of generation, by the game management center, of a win indicator determining whether the game ticket presented is a winner or a loser; and a step of transmission by the game management center and to the game terminal, of a result containing said win indicator; and in that during the presentation step, the game terminal generates at least one representation of the game ticket as a function of the result transmitted and presents said game ticket under this representation.

Thus, the method of game management according to the invention limits the number of exchanges between the game terminal and the game management center, since when the ticket is presented to the player, the game management center already knows whether the ticket is a winner or a loser.

The method of game management according to the invention may moreover comprise one or more of the following characteristics:

the game has predetermined probability of winning, and the game management center generates said win indicator, as a function of the probability of winning;

the game management center and the remote game terminal are interlinked by at least one bidirectional communication path;

the method comprises a step of transmission, by the game terminal and to the game management center, of a game ticket request message;

during the step of transmission of the message, the latter is encrypted with the aid of a symmetric or asymmetric encryption method;

the game ticket request message comprises a seed generated by the game terminal, and this seed is used by the game management center to randomly determine whether the game ticket presented is a winner or a loser;

the game terminal generates at least two representations of the game ticket, a first representation not indicating whether it is a winner or a loser, the game ticket comprising for example several zones comprising masked symbols, and a second representation indicating whether the game ticket is a winner or a loser as a function of the result, a predetermined number of zones being for example unmasked and the game terminal dynamically choosing each symbol unmasked by the player as a function of the result;

the result is encrypted by the game management center with the aid of a symmetric or asymmetric encryption method;

during the step of generating said win indicator, the game management center furthermore generates a number identifying the game ticket, and the result comprises this number identifying the game ticket;

if the game ticket is determined to be a winner, the method furthermore comprises a step of transmission, by the game terminal to the game management center, of a proof of win comprising the number identifying the game ticket;

during the step of transmission of the proof of win, the latter is encrypted with the aid of a symmetric or asymmetric encryption process;

the result comprises a ticket generation seed, and this ticket generation seed is used by the game terminal for the presentation of the game ticket;

the predetermined probability of winning of the game comprises a statistical distribution of win values;

the result of the determination comprises a win value dependent on the statistical distribution of win values, if the ticket is determined to be a winner;

the ticket is issued by the game management center after receipt by the latter of a proof of payment; and the game management center manages several games, and subsequent to the game ticket request step, the game management center chooses at least one type of game ticket corresponding to at least one game.

The invention also relates to a center for game management, characterized in that it comprises means of reception of a game ticket request issued by a player, means of generation of at least one game ticket that are activated by the receipt of the request, and means of determination, whether the game ticket is a winner or a loser, before the latter is presented to the player.

The invention also relates to a game terminal, characterized in that it comprises means of issuing a request for at least one game ticket, means of reception of the result of a determination, whether the game ticket is a winner or a loser, and means of generation of at least one representation of the game ticket, as a function of the result, and of presentation of the game ticket under this representation.

The game terminal according to the invention can furthermore comprise the following characteristic:
the means of generation generate at least two representations of the game ticket, a first representation not indicating whether it is a winner or a loser, and a second representation indicating whether the game ticket is a winner or a loser as a function of the result.

The invention also relates to a system of game management comprising a game management center as described hereinabove and at least one remote game terminal as described hereinabove.

BRIEF DESCRIPTION OF THE DRAWINGS

The invention will be better understood on reading the description which follows, given merely by way of example and while referring to the appended drawings in which.

DETAILED DESCRIPTION OF THE DRAWINGS

Figure 1:
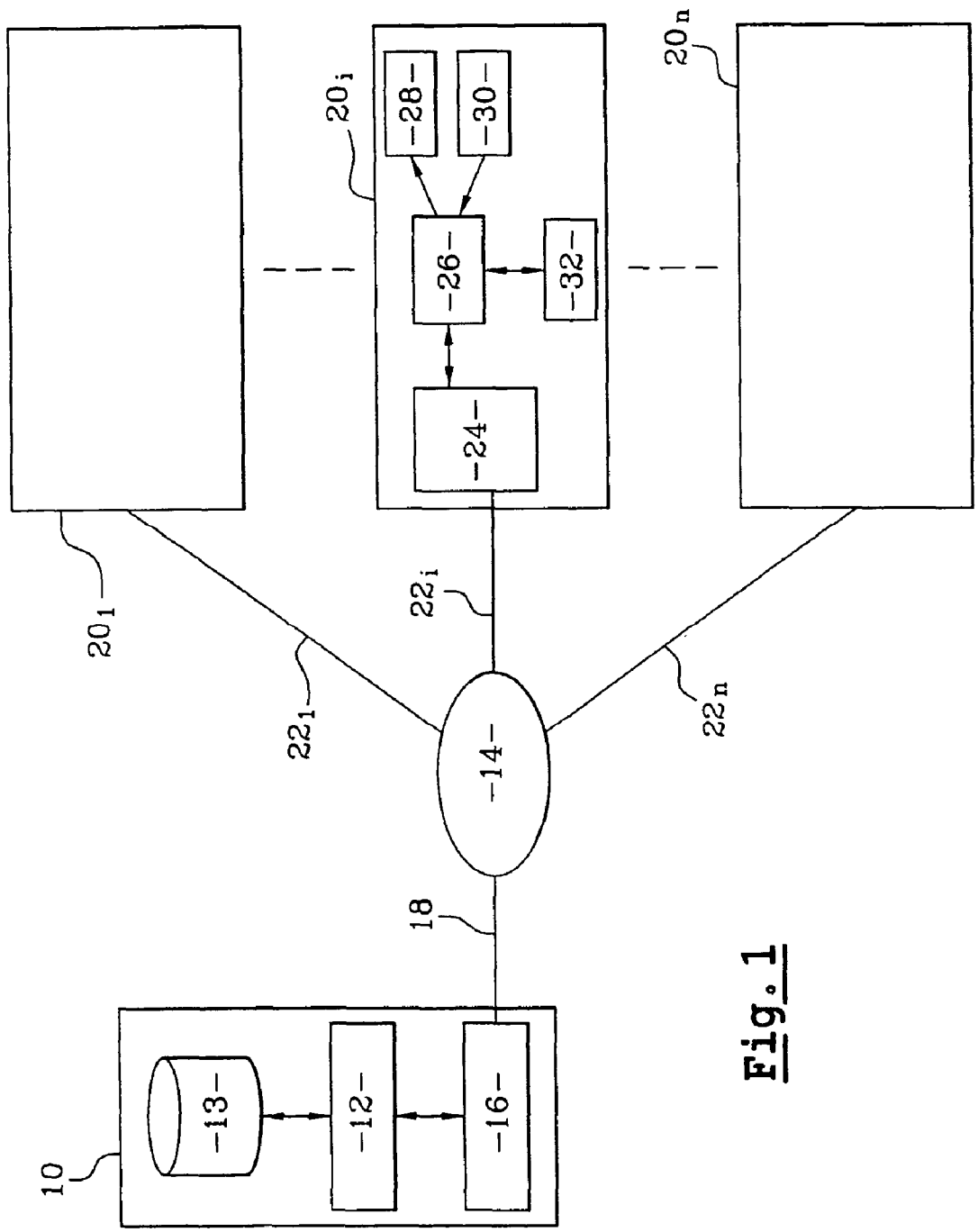
FIG. 1 represents an environment for implementing a game management method according to the invention.

The environment represented in FIG. 1 comprises a game management center 10, located for example at a game organizer and comprising a server 12 of conventional type linked to means 13 of storing probabilities of winning, such as a RAM memory. The server 12 is furthermore linked to an information transmission network 14, such as the Internet, by means of a modem 16 to which it is linked and of a bidirectional link 18 set up between the modem 16 and the Internet network 14.

Moreover, remote game terminals $20_1, \ldots, 20_n$ are also linked to the Internet network 14 by means of bidirectional links $22_1, \ldots, 22_n$. These remote game terminals $20_1, \ldots, 20_n$ are for example microcomputers located at the players' homes.

Each remote game terminal $20_i$ comprises a modem 24 catering for the connection with the bidirectional link $22_i$, and a central methoding unit 26 associated with a display screen 28 and a keyboard 30. The central methoding unit 26 comprises a game application downloaded from the game management center 10, in the form of a Java applet. Moreover, the central methoding unit 26 is linked in bidirectional communication with a conventional electronic payment device 32, such as an electronic purse.

Figure 2:
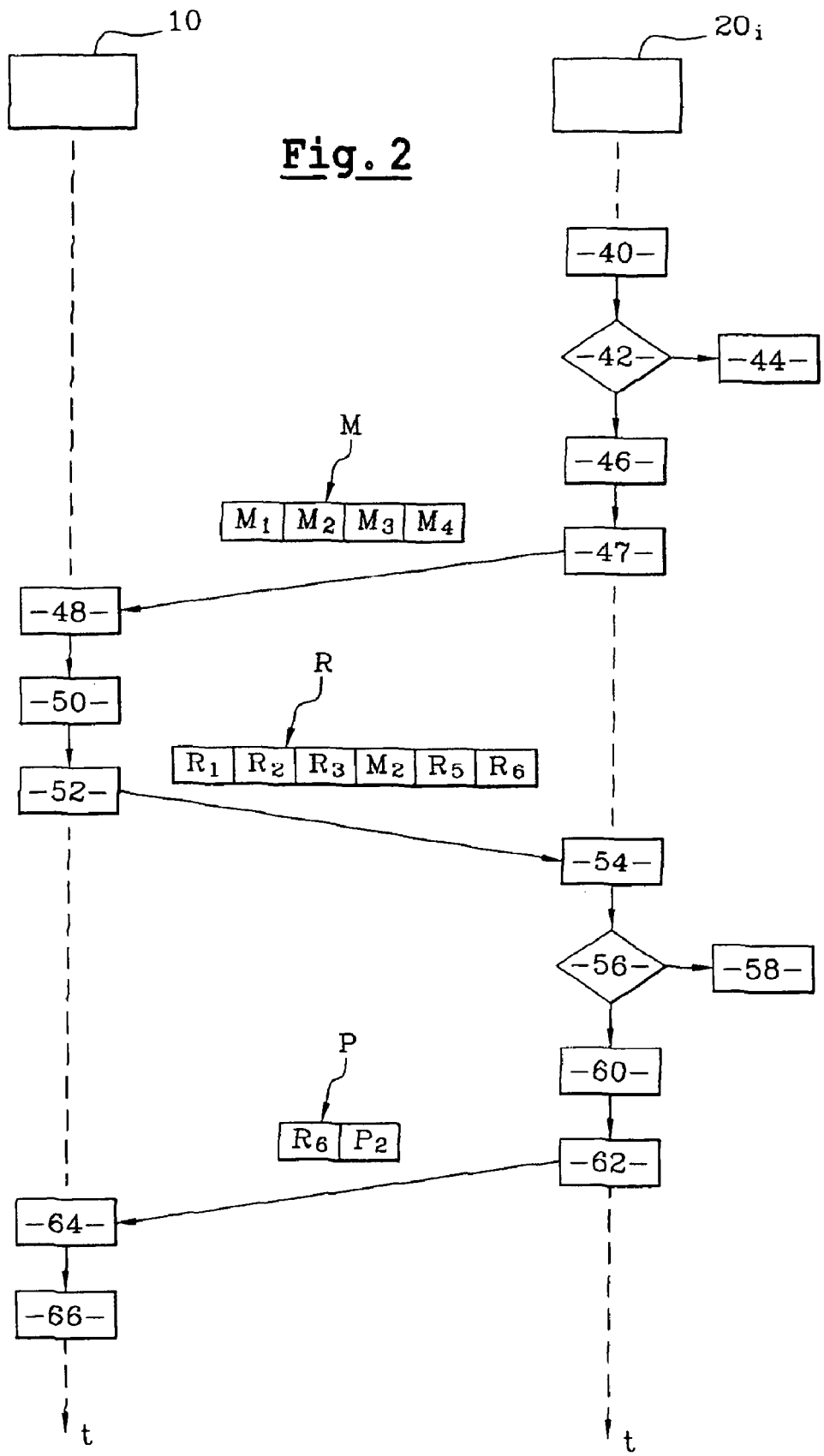
FIG. 2 represents the steps of the game management method according to the invention implemented in the environment of FIG. 1.

Represented in FIG. 2 are the steps of the game management method according to the invention, implemented between the game management center 10 and any remote game terminal $20_i$ chosen from the terminals $20_1$ to $20_n$.

During a first step 40, the player, interacting with the game application stored in the central methoding unit 26 of the game terminal $20_i$, by means of the keyboard 30 and of the display screen 28, requests the purchase of a game ticket.

During the next step 42, the central methoding unit 26 verifies that the content of the electronic purse 32 makes it possible to purchase the requested game ticket. If this is not the case, we go to a cancellation step 44, in the course of which the game application informs the player, via the screen 28, that he does not have enough money.

If the content of the electronic purse 32 allows the purchase of the game ticket, we go to a payment step 46, in the course of which the electronic purse 32 is debited with the sum corresponding to the price of the game ticket requested. The transaction is performed, for example, with a remote payment center (not represented) accessible by Internet. Regarded as conventional, this transaction will not be described further. At the end of this transaction, the electronic purse 32 transmits a proof of payment $M_1$ to the central methoding unit 26 of the game terminal $20_i$.

During the next step 47, the game terminal $20_i$ transmits a ticket request message M to the game management center 10. This message M comprises the proof of payment $M_1$, emanating from the previous step.

Optionally, the message M also comprises a game identification number $M_2$, uniquely defining the type of game ticket requested by the player.

Specifically, the game management center 10 can manage several games, each of which is associated with a predetermined probability of winning. Thus, the game identification number $M_2$ makes it possible to determine which game, and hence which probability of winning, the requested ticket is associated with.

However, the ticket request message M does not necessarily comprise the game identification number $M_2$. Specifically, as a variant, the player transmits the ticket request message M, without having previously chosen a particular game ticket type. In this case, the game management center 10, managing several games, chooses at least one type of ticket corresponding to at least one game, for example randomly.

Also optionally, the game terminal $20_i$ also transmits a symmetric secret key $M_3$, generated automatically by the game terminal $20_i$ in a conventional manner. This key will be used, as will be described subsequently, by the game management center 10, for the symmetric encryption of data.

Finally, optionally, the message M comprises a seed $M_4$ which is, for example, any real number and is intended to be used by the game management center 10 during a determination step which will be described later.

To secure the transmission of information between the game terminal $20_i$ and the game management center 10, a well known means is to use an asymmetric public key cryptography process, in which the game management center 10 possesses a private key $SK_{GP}$ which is known only to itself and a public key $PK_{GP}$ which is known to the terminal $20_i$.

Thus, the message M is transmitted by the terminal $20_i$ to the game management center 10, in encrypted form by means of a conventional encryption function E and of the public key $PK_{GP}$. As a result, M takes the following form:

$$M = E\,PK_{GP}(M_1, M_2, M_3, M_4).$$

Next, during a reception step 48, the game management center 10 decrypts the message M by means of the private key $SK_{GP}$. It thus retrieves the symmetric secret key $M_3$, the seed $M_4$ and the game identification number $M_2$ allowing it to associate the probability of winning corresponding to this identification number $M_2$.

The probability of winning is defined by a statistical distribution of win values that is stored in memory 13. Furthermore, the game management center 10 authorizes passage to the next step of the method, after verification of the proof of payment $M_1$.

The expression "statistical distribution of win values" is understood to mean a real function of the interval [0; 1] in a space of win values, such as the set of reals, or else a set of predetermined prizes.

For example, in the subsequent description, the game corresponding to the game identification number $M_2$ is regarded as a game in which the game ticket comprises a grid of nine masked boxes, of which three contain a cross and six a circle.

The rule of the game consists in uncovering three boxes out of the nine boxes. The player wins 100 Euros if he uncovers three crosses, 10 Euros if he uncovers two crosses, nothing otherwise.

Thus, for this game, the probability of the player winning 100 Euros is 1/84, the probability of the player winning 10 Euros is 18/84 and the probability of the player winning nothing is 65/84.

More precisely, the probability of winning is defined for example by the following statistical distribution of win values d:

d(x)=100, if $0 \leq x < 1/84$;
d(x)=10, if $1/84 \leq x < 19/84$;
d(x)=0, if $19/84 \leq x \leq 1$.

Conventionally, in this type of game, it is the player who determines, when he uncovers three boxes out of these nine boxes, whether the game ticket is a winner or a loser. It will be noted however that, within the framework of the invention, it is the game management center 10 that determines whether the game ticket is a winner or a loser. When this ticket is presented to the player and when the latter chooses three boxes to be uncovered out of the nine boxes, the symbols appearing behind the three uncovered boxes are chosen dynamically by the game application of the game terminal $20_i$, to correspond to the result of the determination performed by the game management center 10.

Thus, during the next determination step 50, the game management center 10 randomly generates a real number $x_{det}$ lying between 0 and 1, possibly from the seed $M_4$. Specifically, a known method for generating $x_{det}$ is to use a conventional pseudo-random number generating function, using an input variable, such as a real number, called a seed.

Next, during this same step, the game management center 10 generates a win value $R_2=d(x_{det})$ as well as an indicator $R_1$ equal to 0 if the win value $R_2$ is zero and to 1 otherwise. Moreover, it generates a game ticket identifying number $R_3$.

The game management center 10 keeps for each winning ticket, in memory 13, the game ticket identifying number $R_3$ associated with the indication $R_1$ and with the win value $R_2$ as well as the game identifying number $M_2$. Thus, it knows, before the game ticket is presented to the player, whether this ticket is a winner or a loser.

Next, during a step 52, the game management center 10 transmits a response R containing the indicator $R_1$, the win value $R_2$ if the indicator $R_1$ is equal to 1 and the game ticket identifying number $R_3$ to the game terminal $20_i$.

Optionally, the response R furthermore comprises the game identifying number $M_2$ and a ticket generation seed $R_5$, which is, like $M_4$, any real number.

Finally, the response R comprises a signature $R_6$ calculated with the aid of a conventional hash function Sign and of the private key $SK_{GP}$, from the aforesaid data contained in the response R, that is to say $R_1, R_2, R_3, M_2$ with the exception of $R_5$. It follows that:

$R_6 = \text{Sign } SK_{GP}(R_1, R_2, R_3, M_2)$.

The response R is transmitted to the game terminal $20_i$ in encrypted form, with the aid of the encryption function E and of the symmetric secret key $M_3$, known only to the game terminal $20_i$ and to the game management center 10. R therefore takes the following form:

$R = E M_3(R_1, R_2, R_3, M_2, R_5, R_6)$.

During the next step 54, the game terminal $20_i$ decrypts the response R with the aid of the symmetric secret key $M_3$ and verifies, with the aid of the public key $PK_{GP}$, that the signature $R_6$ does indeed correspond to the content of the response R.

Next, during a test step 56, the game terminal $20_i$ verifies the value of the indicator $R_1$.

If $R_1$ equals 0, we go to step 58, during which the game terminal $20_i$ generates a game ticket to be scratched, possibly with the aid of the ticket generating seed $R_5$, and displays the latter on the screen 28. Specifically, the game terminal $20_i$ can use a conventional pseudo-random generating function to randomly diversify the presentation of the game ticket to be scratched.

During this step, whatever three boxes are uncovered by the player, the ticket presented on the screen 28 is a losing ticket, that is to say the boxes uncovered comprise at most one cross.

The presentation of the losing ticket is moreover implemented entirely by the game application recorded in the central methoding unit 26 of the game terminal.

Specifically, the game application generates at least one first representation of the game ticket not indicating whether the latter is a winner or a loser, before the player has uncovered a first box, and a second representation of the game ticket, indicating that the latter is a loser, when the player has uncovered three boxes.

On the other hand, if the indicator $R_1$ equals 1, we go to a step 60. During this step 60, the game terminal $20_i$ generates a ticket to be scratched, just as above, and presents the latter on the screen 28. However, in this case, the ticket to be scratched is a ticket which will be presented as a winner regardless of the player's choice.

If, moreover, the win value $R_2$ equals 10, then whatever boxes are uncovered by the player, they comprise two crosses. If the win value $R_2$ equals 100, the three boxes uncovered by the player each comprise a cross.

As above, the game application generates at least one first representation of the game ticket not indicating whether the latter is a winner or a loser, before the player has uncovered a first box, and a second representation of the game ticket, indicating the symbols corresponding to the win value $R_2$, when the player has uncovered three boxes.

During step 62 following step 60, the game terminal $20_i$ transmits a proof of winning P to the game management center 10, this proof comprising the signature $R_6$ and payment information $P_2$ such as for example a number of a bank account of the player, to which the game management center 10 can remit the sum won by the player during the previous step.

This proof of winning P is transmitted to the game management center 10 in encrypted form, with the aid of the encryption function E and of the asymmetric public key $PK_{GP}$. It follows that:

$P = E PK_{GP}(R_6, P_2)$.

Finally, during a last step 64, the game management center 10 verifies the validity of the signature $R_6$ and verifies that the ticket corresponding to the ticket identifying number $R_3$ has not already been rewarded.

Any appropriate means can then be implemented to forward the prize to the winner during a step 66.

It is clearly apparent that the game management method according to the invention allows the straightforward implementation of the management of a game with predetermined probability of winning, by presenting the player with a game ticket which has already been determined as being a winner or a loser by the game management center 10, as a function of the probability of winning.

Another advantage of the method described above is to allow very straightforward implementation on the game management center 10 side, the latter comprising in memory the statistical distribution of win values corresponding to the type of game ticket requested by the player and transmitting only the result of the determination to the game terminal, without generating the game ticket. Specifically, the generation of the game ticket, the forwarding of the winning or losing ticket and the presentation of the response are performed entirely by the game terminal $20_i$, by virtue of the game application loaded into it.

Moreover, little data is exchanged between the game management center 10 and the game terminal $20_i$ since the look of the ticket upon presentation thereof to the user is determined by the game terminal. Very little bandwidth is therefore required between the game management center and the terminal in order to implement the method of the invention.

Finally, it will be noted that the invention is not limited to the embodiment described above.

Specifically, as a variant, the statistical distribution of win values can be represented by a discrete function having discrete values.

The invention claimed is:

1. A method of game management between a game management center and a game terminal linked through an information transmission network, the method comprising steps of:
    requesting, via the game terminal, a game ticket from the game management center;
    presenting, via the game terminal, the game ticket, wherein between the step of requesting the game ticket and the step of presenting the game ticket, the following steps are performed:
    generating, via the game management center, a win indicator which is used for determining whether the game ticket presented via the game terminal is a winner or a loser; and
    transmitting a result containing the win indicator from the game management center to the game terminal;
    and during the step of presenting the game ticket, generating by the game terminal one of at least two different representations of the game ticket including a first representation not indicating a result of whether the game ticket is a winner or a loser, the game ticket comprising several zones comprising masked symbols, and a second representation indicating whether the game ticket is a winner or a loser as a function of the result, a predetermined number of zones being unmasked and the game terminal dynamically choosing each symbol unmasked by a player as a function of the result, and wherein the game ticket is presented under one of the first and second representations.

2. The method of game management as claimed in claim 1, wherein the game ticket has a predetermined probability of winning, and the game management center generates the win indicator, using the predetermined probability of winning.

3. The method of game management as claimed in claim 1, further comprising a step of transmitting from the game terminal to the game management center a game ticket request message.

4. The method of game management as claimed in claim 3, wherein the game ticket request message comprises a seed generated by the game terminal and the seed is used by the game management center to randomly determine whether the game ticket presented is a winner or a loser.

5. The method of game management as claimed in claim 1, wherein the result comprises a ticket generation seed, and the ticket generation seed is used by the game terminal for the presentation of the game ticket.

6. The method of game management as claimed in claim 2, wherein the predetermined probability of winning comprises a statistical distribution of win values.

7. The method of game management as claimed in claim 6, wherein the result comprises a win value dependent on the statistical distribution of win values, when the game ticket is determined to be a winner.

8. A game terminal linked through an information transmission network to a game management center, the game terminal comprising:
    means for issuing a request for a game ticket;
    means for receiving a result of a determination indicating whether the game ticket is a winner or a loser where the determination is made by the game management center; and
    means for generating one of at least two different representations of the game ticket including a first representation not indicating whether the game ticket is a winner or a loser, the game ticket comprising several zones comprising masked symbols, and a second representation indicating whether the game ticket is a winner or a loser, a predetermined number of zones being unmasked and the game terminal dynamically choosing each symbol unmasked by a player as a function of the result, and presenting the game ticket under one of the first and second representations.

* * * * *